A. G. STEINBRENNER.
BRACKET SUPPORT FOR VEHICLE TOPS.
APPLICATION FILED MAR. 16, 1910.

1,016,653.

Patented Feb. 6, 1912.

ATTEST
E. M. Fisher
H. Mussun

INVENTOR
ANDREW G. STEINBRENNER
BY Fisher & Moser ATTYS.

UNITED STATES PATENT OFFICE.

ANDREW G. STEINBRENNER, OF CLEVELAND, OHIO.

BRACKET-SUPPORT FOR VEHICLE-TOPS.

1,016,653.  Specification of Letters Patent.  Patented Feb. 6, 1912.

Application filed March 16, 1910. Serial No. 549,589.

*To all whom it may concern:*

Be it known that I, ANDREW G. STEINBRENNER, a citizen of the United States, residing at Cleveland, in the county of Cuyahoga and State of Ohio, have invented certain new and useful Improvements in Bracket - Supports for Vehicle - Tops, of which the following is a specification.

My invention relates to a new and original construction of arm for vehicle tops adapted to be used in connection with automobiles, carriages, buggies and wagons, substantially as herein shown and described and particularly pointed out in the claim.

Figure 1:
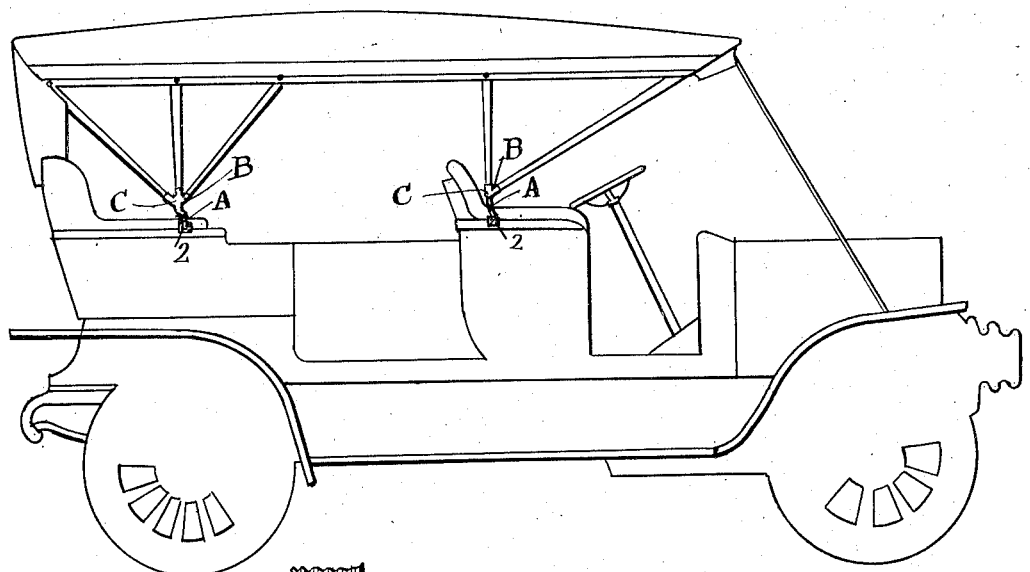
Figure 2:
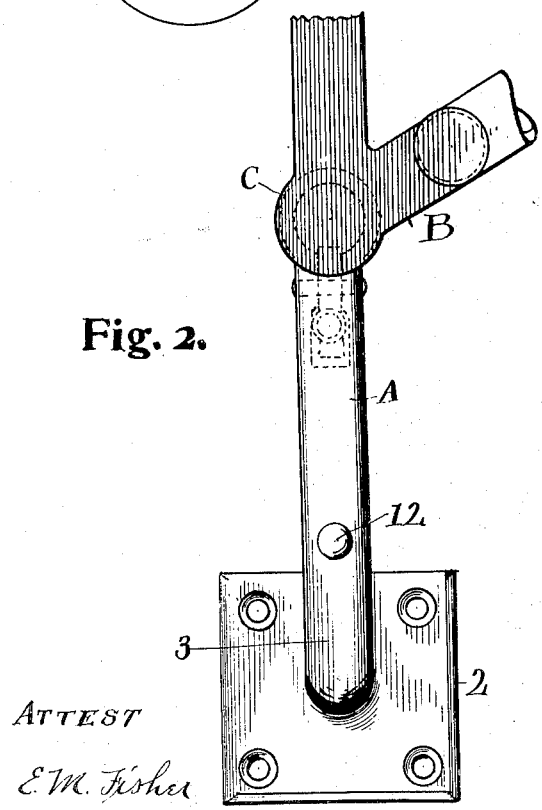
Figure 3:
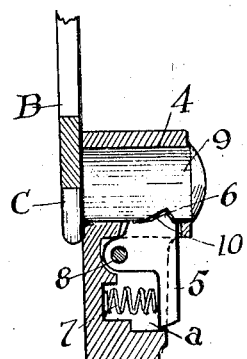

In the accompanying drawings, Figure 1 is a side elevation of an automobile having a top with bows sustained by my new and improved devices, and Fig. 2 is a side elevation of the sustaining parts. Fig. 3 is a sectional elevation of Fig. 2 at right angles thereto.

As thus shown the invention, comprises, first, the arm A, which is intended to be rigidly affixed to a vehicle body and to become a rigid and fixed support for the top through the immediate support C for the bows B. To this end said arm is constructed with a flat and relatively wide face portion 2 at its bottom or base provided with screw holes to fasten it in place, an outwardly curved and substantially right angled elbow 3 and a socket 4 transversely at its top. This brings the said base 2 and the body of said arm substantially into parallel planes. Next beneath said socket 4 and on the inside the said arm has a recess or slot $a$ which opens into said socket and in which there is a pivotally mounted catch or latch 5, having a tooth or engaging portion 6 projecting into said socket, and a spiral spring 7 in recess $a$ bears against the lower portion of said catch 5 in such relation to the pivot 8 thereof that the said catch is held normally in engaging position. Now, having an arm like this in place on a vehicle body, say in position to support the bows of the top therefrom wherever they may be located, I employ a bow support or supporting member C, which may have several arms according to the number of bows to be supported thereon or therefrom and which has a lateral projection 9 on its inner side and bottom of a size and shape to enter snugly into socket 4 and support the top thereon. Said projection has a notch 10 on its bottom adapted to be engaged by the point or nose 6 on said catch 5 when the parts are operatively united and thus lock them temporarily together. Now, having the parts united in this way the connection between them is not only secure and noiseless in operation but such as to permit easy and convenient detachment and the latch 5 is such as to spring automatically into engagement when the parts are brought together.

The part C may have one, two, or three branches and be otherwise differentiated to connect one or several bows therewith, according to its location on the vehicle, and two different forms thereof are shown in this instance.

Bracket arm A is also provided with an integral or rigid button 12 at its outside which is of advantage in fastening the usual side curtains directly upon said bracket instead of upon the body of the vehicle as is now the case. Obviously when the curtain is held by this button 12, accidental displacement of projection 9 is more or less prevented if latch 5 is open or not properly locked.

The foregoing mechanism is not only exceedingly convenient for attachment and detachment of the top, but it is particularly advantageous and valuable on account of the peculiar shape of the arm A which extends laterally directly from its point of attachment to the car body and thus widens the bows and the top very materially as compared with the car body and especially affords elbow room to the party who is driving the car.

What I claim is:

In supports for vehicle tops, a bracket arm adapted to be rigidly affixed to a vehicle body and having a body portion with a substantially right angled outwardly curved elbow near its base, said arm provided with a transverse sleeve shaped socket 4 in its upper end at substantially right angles to its base and a recess $a$ on its inside next beneath said socket and open thereto, a spring pressed catch 5 and a pivot 8 therefor in said recess and a spring behind said catch adapted to throw the same upward into said socket, in combination with a vehicle top support C having an inward projection 9 on its inside fitting in said socket and provided with a notch on its under side engaged by said catch, said catch being adapted to be engaged below its pivot to be depressed and thus disengage said projection 9 and permit the top to be removed.

In testimony whereof I affix my signature in presence of two witnesses.

ANDREW G. STEINBRENNER.

Witnesses:
F. C. MUSSUN,
E. M. FISHER.